(12) United States Patent
Jorgenson et al.

(10) Patent No.: US 11,411,613 B2
(45) Date of Patent: Aug. 9, 2022

(54) ADAPTATION OF COORDINATED RADIO FREQUENCY TRANSMISSIONS AND RECEPTIONS

(71) Applicant: Rockwell Collins, Inc., Cedar Rapids, IA (US)

(72) Inventors: Mark B. Jorgenson, Kanata (CA); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/139,362

(22) Filed: Dec. 31, 2020

(65) Prior Publication Data
US 2022/0209826 A1    Jun. 30, 2022

(51) Int. Cl.
| | | |
|---|---|---|
| *H04B 7/02* | (2018.01) | |
| *H04B 7/026* | (2017.01) | |
| *H04B 7/024* | (2017.01) | |
| *H04W 84/18* | (2009.01) | |
| *H04B 7/0426* | (2017.01) | |
| *H04B 7/155* | (2006.01) | |

(52) U.S. Cl.
CPC ............. *H04B 7/026* (2013.01); *H04B 7/024* (2013.01); *H04B 7/043* (2013.01); *H04B 7/15528* (2013.01); *H04W 84/18* (2013.01)

(58) Field of Classification Search
CPC ........ H04B 7/026; H04B 7/043; H04B 7/024; H04B 7/15528; H04W 84/18
USPC .......................................................... 375/262
See application file for complete search history.

(56) References Cited

U.S. PATENT DOCUMENTS

| | | |
|---|---|---|
| 4,639,937 A | 1/1987 | McRae et al. |
| 7,382,315 B1 | 6/2008 | Stevens et al. |
| (Continued) | | |

FOREIGN PATENT DOCUMENTS

| | | |
|---|---|---|
| EP | 2472801 B1 | 5/2020 |
| KR | 100090099 B1 | 3/2007 |
| (Continued) | | |

OTHER PUBLICATIONS

Extended Search Report in European Application No. 21218114.3 dated May 30, 2022, 10 pages.
(Continued)

*Primary Examiner* — Don N Vo
(74) *Attorney, Agent, or Firm* — Suiter Swantz pc llo

(57) ABSTRACT

A communication system is disclosed. The communication system includes a plurality of antennas disposed on one or more platforms, at least one transmitter, at least one receiver, and a control module communicatively coupled to the at least one receiver and at least one transmitter, and disposed on a separate platform than at least one antenna of the plurality of antennas. The control module is configured to control received and transmitted signals. The control module includes a controller, one or more processors, and a memory communicatively coupled to the one or more processors and having instructions stored upon. The instructions, when executed by the one or more processors, cause the one or more processors to receive antenna attribute data, and instruct the controller to configure the communication system for at least one of the diversity signal processing, the adaptive antenna processing, or the relay communication processing.

15 Claims, 8 Drawing Sheets

(56) References Cited

U.S. PATENT DOCUMENTS

| | | | |
|---|---|---|---|
| 7,764,655 | B2 | 7/2010 | Ransome et al. |
| 8,520,569 | B2 * | 8/2013 | Periyalwar ............. H04B 7/026 |
| | | | 370/310 |
| 8,532,646 | B2 * | 9/2013 | Watanabe ............ H04B 7/0613 |
| | | | 455/422.1 |
| 9,681,464 | B2 | 6/2017 | Chou |
| 9,973,242 | B2 | 5/2018 | Gerszberg et al. |
| 10,103,853 | B2 * | 10/2018 | Moshfeghi ............ H04L 5/0032 |
| 2010/0157901 | A1 | 6/2010 | Sanderovitz et al. |
| 2018/0139016 | A1 | 5/2018 | Moshfeghi |
| 2018/0316746 | A1 * | 11/2018 | Shattil ................... H04L 41/147 |
| 2019/0305831 | A1 * | 10/2019 | Freisleben ........... H04B 1/0057 |
| 2019/0363776 | A1 * | 11/2019 | Murota ................ H04B 1/0475 |
| 2020/0169995 | A1 | 5/2020 | Nam et al. |

FOREIGN PATENT DOCUMENTS

| | | |
|---|---|---|
| WO | 2006121381 A1 | 11/2006 |
| WO | 2006131048 A1 | 12/2006 |

OTHER PUBLICATIONS

Honglin Hu et al: "Wireless Mesh Networking, Multiple Antenna Techniques for Wireless Mesh Networks", Wireless Mesh Networking, XX, XX, Jan. 1, 2006 (Jan. 1, 2006), pp. 1-28, XP002473046, * section 11.2 *.

Jenekar Sanjeenani et al: "MIMO System Using Transmit Diversity and Relay Selection Algorithm", 2013 Third International Conference on Advances in Computing and Communications, IEEE, Aug. 29, 2013 (Aug. 29, 2013), pp. 351-354, XP032534486, DOI: 10.1109/ICACC.2013.75 [retrieved on Dec. 17, 2013] *sections III, IV*.

* cited by examiner

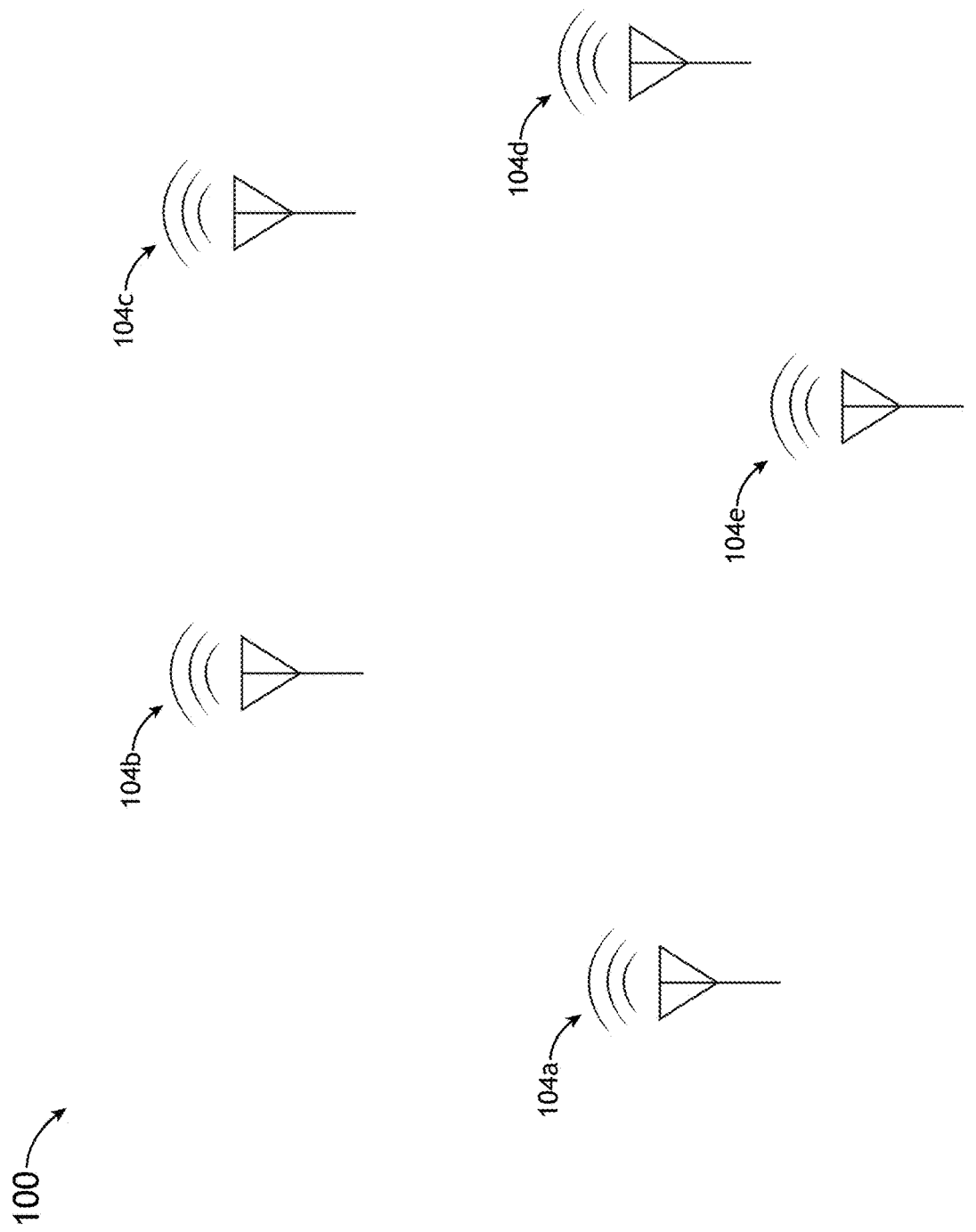

ADAPTATION OF COORDINATED RADIO FREQUENCY TRANSMISSIONS AND RECEPTIONS

BACKGROUND

Wireless communication systems, such as radio frequency (RF) communication systems, include an antenna for receiving and transmitting RF signals. Antennas can be fabricated according to a number of different designs and sizes. Certain types and sizes of antennas provide better transmission and reception for certain types of communications. Antennas for RF communication systems are often affixed to military and civilian naval, ground and airborne vehicles, personnel or platforms for relaying messages and data.

In some instances, multiple antennas may be utilized in an organized fashion to improve the transmission and reception of messages. For example, a communication system may be designed with closely spaced antennas for beamforming purposes, which may provide gain within a desired direction. In another example, a communication system may be designed with multiple antennas to be utilized for diversity combining, where multiple received signals from the multiple antennas are combined into a single improved signal. In another example, a communication system may be designed with multiple antennas designed to send and receive the same message in different slots, resulting in a receive diversity that improves the quality of the signal. Although useful for specific purposes, these communications systems are limited in their ability to adjust to the needs of users in the field, as the communication needs of the user may change rapidly upon situational changes in the field. Therefore, it would be advantageous to provide a solution that cures the shortcomings described above.

SUMMARY

A communication system is disclosed. In one or more embodiments, the system includes a plurality of antennas disposed on one or more platforms. In one or more embodiments, the system includes at least one transmitter communicatively coupled to at least one antenna of the plurality of antennas. In some embodiments, the system includes at least one receiver communicatively coupled to at least one antenna of the plurality of antennas. In some embodiments, the system includes at least one control module communicatively coupled to the at least one transmitter and the at least one receiver, and disposed on a separate platform than at least one antenna of the plurality of antennas, wherein the at least one control module is configured to control receiving signals received by the at least one receiver, and transmission signals transmitted by the at least one transmitter. In some embodiments, the control module includes a controller. In some embodiments, the control module includes one or more processors communicatively coupled to the controller. In some embodiments, the control module includes a memory communicatively coupled to the one or more processors and having instructions stored upon. In some embodiments, the instructions, when executed by the one or more processors, cause the one or more processors to receive antenna attribute data. In some embodiments, the instructions, when executed by the one or more processors, cause the one or more processors to determine a compatibility of at least one antenna of the plurality of antennas for at least one of diversity signal processing, adaptive antenna processing, or relay communication processing based on the antenna attribute data. In some embodiments, the instructions, when executed by the one or more processors, cause the one or more processors to instruct the controller to configure the communication system for at least one of the diversity signal processing, the adaptive antenna processing, or the relay communication processing based on the compatibility In some embodiments of the system, system is configurable for two or more of the relay communication processing, the diversity signal processing, or the adaptive antenna processing.

In some embodiments of the system, the system is synchronously configured for at least two of the diversity signal processing, the adaptive antenna processing, or the relay communication processing In some embodiments of the system, the diversity signal processing comprises at least one of transmit diversity, receive diversity, or diversity combining.

In some embodiments of the system, the adaptive antenna processing comprises at least one of beamforming or nulling.

In some embodiments of the system, the relay communication processing comprises at least one of relay transmit diversity, relay receive diversity, or avalanche relay.

In some embodiments of the system, the system comprises at least one node in an ad hoc network.

In some embodiments of the system, the system further includes an antenna attribute unit configured to determine at least one attribute of the antenna attribute data.

A method is also disclosed. In one or more embodiments, the method includes receiving antenna attribute data from a plurality of antennas of a communication system, wherein the plurality of antennas is disposed on at least two platforms. In one or more embodiments, the method includes determining a compatibility of at least one of the plurality of antennas are configurable for at least one of diversity signal processing, adaptive antenna processing, or relay communication processing. In one or more embodiments, the method includes instructing a controller to configure the communication system for at least one of diversity signal processing, adaptive antenna processing, or relay communication processing based on the compatibility.

In some embodiments of the method, the communication system is configurable for two or more of the diversity signal processing, the relay communication processing or the adaptive antenna processing.

In some embodiments of the method, wherein the communication system is synchronously configured for at least two of the diversity signal processing, the adaptive antenna processing, or the relay communication processing.

In some embodiments of the method, the diversity signal processing comprises at least one of transmit diversity, receive diversity, or diversity combining.

In some embodiments of the method, the adaptive antenna processing comprises at least one of beamforming or nulling.

In some embodiments of the method, the relay communication processing comprises at least one of relay transmit diversity, relay receive diversity, or avalanche relay.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 2C is a diagram illustrating a communication system configured for relay communication processing, in accordance with one or more embodiments of this disclosure;

DETAILED DESCRIPTION

Figure 1:
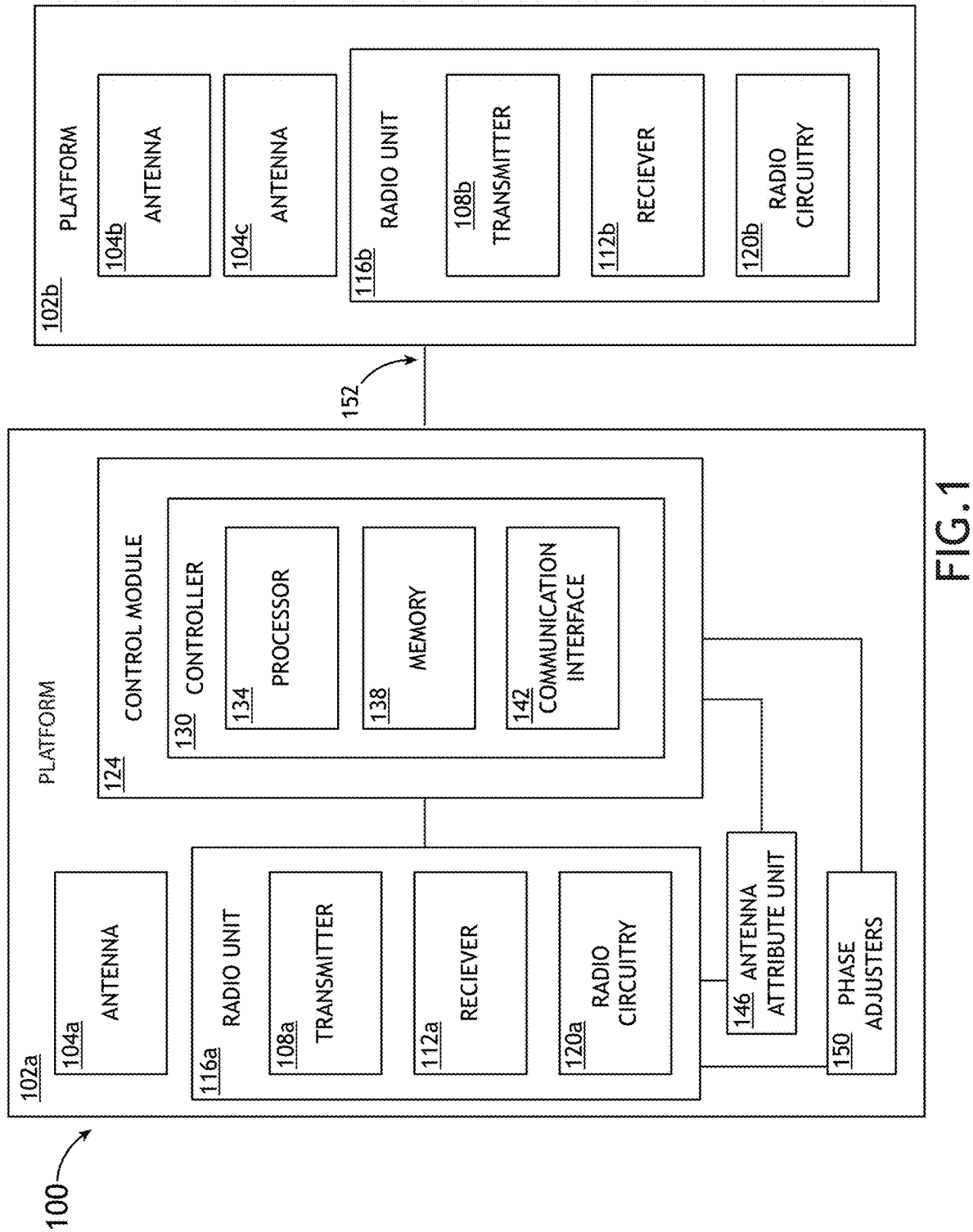
FIG. 1 is a block diagram illustrating a communication system 100 in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, the embodiments of the disclosure are directed to a communication system. Specifically, the embodiments of the disclosure are directed to a communication system where nodes (e.g., platforms) within a group are interconnected by a local bearer (e.g., a low latency, high data rate bearer), with communication between groups maintained through long range signals (e.g., RF signals) supported by the architecture. The communication system includes multiple antennas, of which some of the antennas may be placed on mobile platforms, such as on an aircraft. The communication system is configured to organize the multiple antennas so that the quality of a signal may be increased as the message is transmitted and/or received through the system. The communication system may use more than one method of improving the quality of the signal through the use of multiple antennas, depending on one or more characteristics of at least one of the antennas, such as the distance from one antenna to another. These multiple antenna methods for improving the antenna signal include beamforming, nulling, diversity transmitting/receiving, receive combining, and diversity "avalanche" relay, all of which will be described further herein.

FIG. 1 is a block diagram illustrating a communication system 100 in accordance with one or more embodiments of this disclosure. In some embodiments, the communication system 100 includes one or more platforms 102a-b with each platform configurable to transmit and/or receive a signal. The one or more platforms 102a-b may be mobile platforms, nonmobile platforms, or any structure upon which an antenna may be disposed. For example, the one or more platforms 102a-b may be configured as any type of vehicle including but not limited to aircraft, troop transport vehicles (e.g., jeeps), trailers, tanks, automobiles and artillery. In another example, the one or more platforms 102a-b may be configured as a backpack. In another example, the one or more platforms 102a-b may be configured as a radio housing. In another example, the one or more platforms may be configured as a forward operating base (FOB). The communication system 100 may also include or more nodes in an ad hoc network (e.g., a mobile ad hoc network)

In some embodiments, the communication system 100 includes one or more antennas 104a-c disposed on the one or more platforms 102a-b. The one or more platforms 102a-c may include any number of the one or more antennas 104a-c. For example, the one or platforms 102a-b may have a single antenna, two antennas, or ten antennas. The one or more antennas 104a-c may be any type of antenna known including but not limited to whip antennas, dipole antennas, isotropic antennas, monopole antennas, array antennas (i.e., one or more elements of an array antenna), loop antennas, conical antennas, aperture antennas, Y-shaped antennas, C-shaped antennas, bent antennas, straight antennas. For example, the one or more antennas 104a-c may be a 15-foot whip antenna. One or more of the one or more platforms 102a-b may include antennas of different types.

In some embodiments, the one or more platforms 102a-b include a transmitter 108a-b and/or receiver 112a-b configured to transmit and/or receive signals and disposed in a radio unit 116a-b. The transmitter 108a-b and receiver 112a-b may be combined to form a transceiver. The radio unit 116a-b further includes radio circuitry 120a-b configured to process signals received or to be transmitted by the radio unit 116 a-b. The radio circuitry may contain any number or type processing circuits (e.g., integrated circuits, FPGA, or wiring boards) to process radio signals.

In some embodiments, the communication system 100 may include one or more control modules 124 communicatively coupled to the one or more radio units 116a-b and configured to control the input and/or output of at least one of the one or more antennas 104a-c of the system. The communication system 100 include any number of control modules 124. For example, the communication system 100 may include a single control module 124 disposed on one of the one or more platforms 102a-b (i.e., acting as a master control module among the servant one or more antennas 104a-c). In another example, all of the one or more platforms 102a-b include a control module 124 (i.e., each control module having an ability to control the input and/or output of one or more antennas 124a-c in the communication system. In another example, some of the platforms 102a-b include a control module 124. The control module 124 may be configured as a stand-alone module within the one or more platforms 102a-b or may be integrated into one or more components of the platform 102a-b. For example, the control module 124 may be incorporated within a housing of the radio unit 116a-b, where it is communicatively coupled to, or is incorporated with, the radio circuitry 120a-b. The control module may operate automatically or may be operated manually via a user interface.

In embodiments, the control module 124 includes one or more controllers 130 communicatively coupled to other components within the control module 124 and/or one or more platforms 102a-b. The one or more controllers 130 may include one or more processors 134, memory 138, and a communication interface 142. The memory 138 may store (e.g., have stored upon) one or more sets of program instructions. The one or more processors 134 may be configured to execute the one or more sets of program instructions to carry out one or more of the various steps described throughout the present disclosure. For example, the one or more processor 134 may be instructed to receive an input. For instance, the one or more processors 134 may be instructed to receive antenna attribute data (e.g., such as antenna position data). In another example, the one or more processors 134 may be instructed to determine a compatibility of at least one antenna (104a-c) of the antennas 104a-c in the communication system 100 (i.e., of a plurality of antennas 104a-c) for at least one of diversity processing, adaptive antenna processing, or relay processing based on the antenna attribute data. In another example, the one or more processors 134 may be instructed to instruct the controller 130 to configure the communication system 100 for at least one of diversity signal processing, adaptive antenna processing, or relay communication processing based on the compatibility.

In some embodiments, one or more platforms 102a-b includes an antenna attribute unit 146 communicatively coupled to the control module and the one or more radio units 116a-b, and configured to gather antenna attribute data. The antenna attribute unit 146 may be configured as a stand-alone unit or may be incorporated within one or more components of the platform 102a-b. For example, the antenna attribute unit 146 may be incorporated within the circuitry of the control module. In another example, the antenna attribute unit may be incorporated within the radio circuitry 120a-b of the one or more radio units 116a-b.

Antenna attribute data gathered by the antenna attribute unit 146 may include any data that characterized the one or more antennas 104a-c within the communication system 100 including but not limited to antenna location, distance between antennas 104a-c within the communication system 100, type of antennas 104a-c, transmit capabilities, receive capabilities, current and/or planned use of the antenna (i.e., is the antenna shared with another network). Antenna attribute data gathered by the antenna attribute unit 146 is then sent to the control module 124.

In some embodiments, the communication system 100 includes one or more phase adjusters 150 communicatively coupled to the one or more radio units 116a-b and/or control module 124 and configured to adjust input and/or output from the one or more antennas 104. For example, the one or more phase adjusters may be configured to transform a plurality of antenna into a phased-array type antenna. For instance, the phase adjustments may be coordinated in time with each antenna signal being injected in a particular time by a traffic master, such as the one or more radio units 116a-b. The timing of phase adjustments may be based on the antenna attribute data (e.g., relative distances between antennas, antenna shapes, antenna sized, or antenna orientations).

In some embodiments, the one or more phase adjusters 150 may be configured as digital modem processors. For example, the one or more phase adjusters 150 may be embodied in hardware circuitry or electronic control circuits that can adjust radiated transmissions. The one or more phase adjusters 150 may be operable in a variety of modulation techniques (e.g., amplitude modulation or frequency modulation). The individual radio units 116a-b may then receive and/or transmit the phase adjusted signal. Conventional HF radio circuits in accordance with principles of the present invention can be utilized. The one or more radio units 116a-b and other componentry of the communication system 100 may be configured to adjust the transmit power via the radio circuitry 120a-b. For example, the one or more platforms 102a-b may include computer executing software for providing timing and adjustments and control of the one or more phase adjusters 150. For instance, the computer circuitry may include microprocessor and/or digital signal processor executing software. In another embodiment, an application specific circuit (ASIC) can be utilized.

In embodiments of the communication system, 100, two or more platforms 102a, 102b localized within a grouping of platforms 102a, 102b communicate via a local bearer 152. For example, the local bearer may be a service that supports low latency/high data rate transmission of signals. The local bearer 152 may be configured to support a variety of signal processing techniques including but not limited to diversity signal processing and adaptive antenna processing. For example, the local bearer 152 may be configured to support diversity signal processing techniques that include but are not limited to transmit diversity, receive diversity, or diversity combining. In another example, the local bearer may 152 be configured to support adaptive processing techniques that include but are not limited to beamforming and nulling. The local bearer 152 may also be able to support multiple types of signal processing within the communication system. For example, a communication system 100 may include one or more platforms 102a-e in close vicinity that utilize adaptive antenna processing via the local bearer 152, and may also include two or more platforms 102a-e in close vicinity that participate in diversity signal processing via the local bearer 152.

The control module 124 is configured to determine the ability of the one or more antennas 104a-c of the communication system 100 to collectively act to improve the quality of a radio signal based on available antenna attribute data. Once the collective abilities of the one or more antennas 104a-c have been determined, the control module will then instruct the one or more radio units 116a-c to transmit and/or receive radio signals in the determined collective fashion. FIGS. 2A-E illustrate the types of collective action that may be taken by the one or more antennas 104a-c, in accordance to one or more embodiments of this disclosure.

In some embodiments, the one or more controllers 130 are communicatively coupled to other componentry within the control module 124, one or more radio units 116a-b, and or one or more platforms 102a-b within the communication system 100. For example, one or more of the one or more controllers 130 may be communicatively coupled to the one or more radio units 116a-b, the phase adjuster 150, the one or more platforms 102a-b, and/or the antenna attribute unit 150. The one or more controllers 130 may also be communicatively coupled to other componentry within the communication system 100 not listed here. Therefore, the above description should not be interpreted as a limitation of the present disclosure, but as an illustration.

The one or more processors 134 may include any one or more processing elements known in the art. In this sense, the one or more processors 134 may include any microprocessor device configured to execute algorithms and/or program instructions. In general, the term "processor" may be broadly defined to encompass any device having one or more processing elements, which execute a set of program instructions from a non-transitory memory medium (e.g., the memory 138), where the one or more sets of program instructions is configured to cause the one or more processors 134 to carry out any of one or more process steps.

The memory 138 may include any storage medium known in the art suitable for storing the one or more sets of program instructions executable by the associated one or more processors 134. For example, the memory 138 may include a non-transitory memory medium. For instance, the memory 138 may include, but is not limited to, a read-only memory (ROM), a random-access memory (RAM), a magnetic or optical memory device (e.g., disk), a magnetic tape, a solid-state drive, and the like. The memory 138 may be configured to provide information to the control module 124, the one or more radio units 116a-b, the phase adjuster 150 and/or the antenna attribute unit. In addition, the memory 138 may be configured to store user input and/or antenna attribute data. The memory 138 may be housed in a common controller housing with the one or more processors 134. The memory 138 may, alternatively or in addition, be located remotely with respect to the spatial location of the processors 134, or the one or more controllers 130. For example, the one or more processors 134 and/or one or more controllers 130 may access a remote memory 138 accessible through a network (e.g., wireless, and the like) via one or more communication interfaces 142.

The one or more communication interfaces 142 may be operatively configured to communicate with components of the one or more controllers 130 or any other componentry within the communication system 100. For example, the one or more communication interfaces 142 may be configured to retrieve data from the one or more processors 134 or other devices, transmit data for storage in the memory 138, retrieve data from storage in the memory 138, and so forth. The one or more communication interfaces 142 may also be communicatively coupled with the one or more processors 134 to facilitate data transfer between components of the one or more controllers 130 and the one or more processors 134. It should be noted that while the one or more communication interfaces 142 is described as a component of the one or more controllers 130, one or more components of the one or more communication interfaces 142 may be implemented as external components communicatively coupled to the one or more controllers 130 via a wired and/or wireless connection. The one or more controllers 130 may also include and/or connect to one or more user interfaces.

Figure 2A:
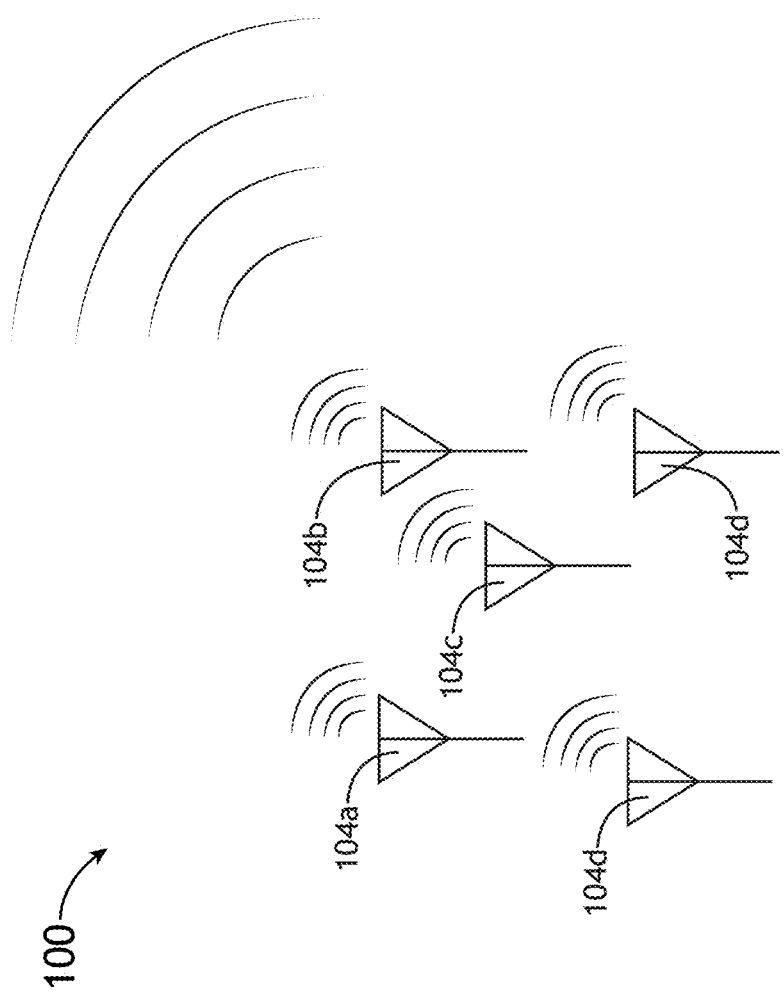
FIG. 2A is a diagram illustrating a communication system configured for adaptive antenna processing in accordance with one or more embodiments of this disclosure.

In some embodiments, one or more antennas 104a-e of the plurality of antennas may be organized via the control module 124 to perform beamforming operations (e.g., as shown in FIG. 2A). Beamforming coherently combines radio signals based on direction and provides gain in a desired direction. When operating as a transmit array, the phase relationship of the signal at each antenna element is manipulated so that the signal emitted by each element in the array combines constructively in the desired direction, resulting in a gain in that direction that is proportional to the number of elements in the array (e.g., as shown in FIG. 2A). On receive, the same principal can be used to obtain gain with respect to signals received from a desired direction, with the resulting coherently combined receive signal benefitting from a gain relative to an isotropic noise environment. In both transmit and receive, the organization and collaboration of the one or more antennas 104a-e is controlled by the control module 124, or multiple control modules 124 acting in concert with each other.

In some embodiments, the one or more antennas 104a-e of the plurality of antennas may be organized via the control module 124 to perform interference nulling, an adaptive antenna operation that involves nulling the radio signal in a particular direction. For example, an array with N antennas 104a-e may form N−1 directional nulls—directions from which signal is effectively cancelled. Interference nulling may be applied to both transmit and receive functions. On receive, interference nulling is useful in cancelling out interference impinging upon the one or more antennas 104a-e from specific directions. On transmit, interference nulling may be useful in preventing the emitted signal from propagating in an unwanted direction, either as a source of interference to another receiver, or to prevent an adversary from hearing a transmission. In both transmit and receive, the organization and collaboration of the one or more antennas 104a-e is controlled by the control module 124, or multiple control modules 124 acting in concert with each other. Many adaptive antenna methods such as nulling require real time exchange of signal information between platforms 104a-e that may be adequately supported through the low latency/high data rate local bearer 152.

Beamforming and interference nulling techniques are best performed when the plurality of antennas 104a-c are closely spaced, as the techniques perform best with a low latency/high data rate local bearer 152. As array elements (i.e., antennas 104a-e) move apart, beamforming and nulling operations become less practical. Feasible distances are measured in terms of the wavelength of the emitted signal and the minimum separation between individual antennas 104a-e should be on the order of a wavelength or less (ideally ½ wavelength for some simple geometries). Separation between antennas 104a-e may be determined using the antenna attribute unit 146, precision location technologies or, in some cases, by analysis of the coherence of the signals received by different antennas 104a-e of the plurality of antennas 104a-e.

Figure 2B:
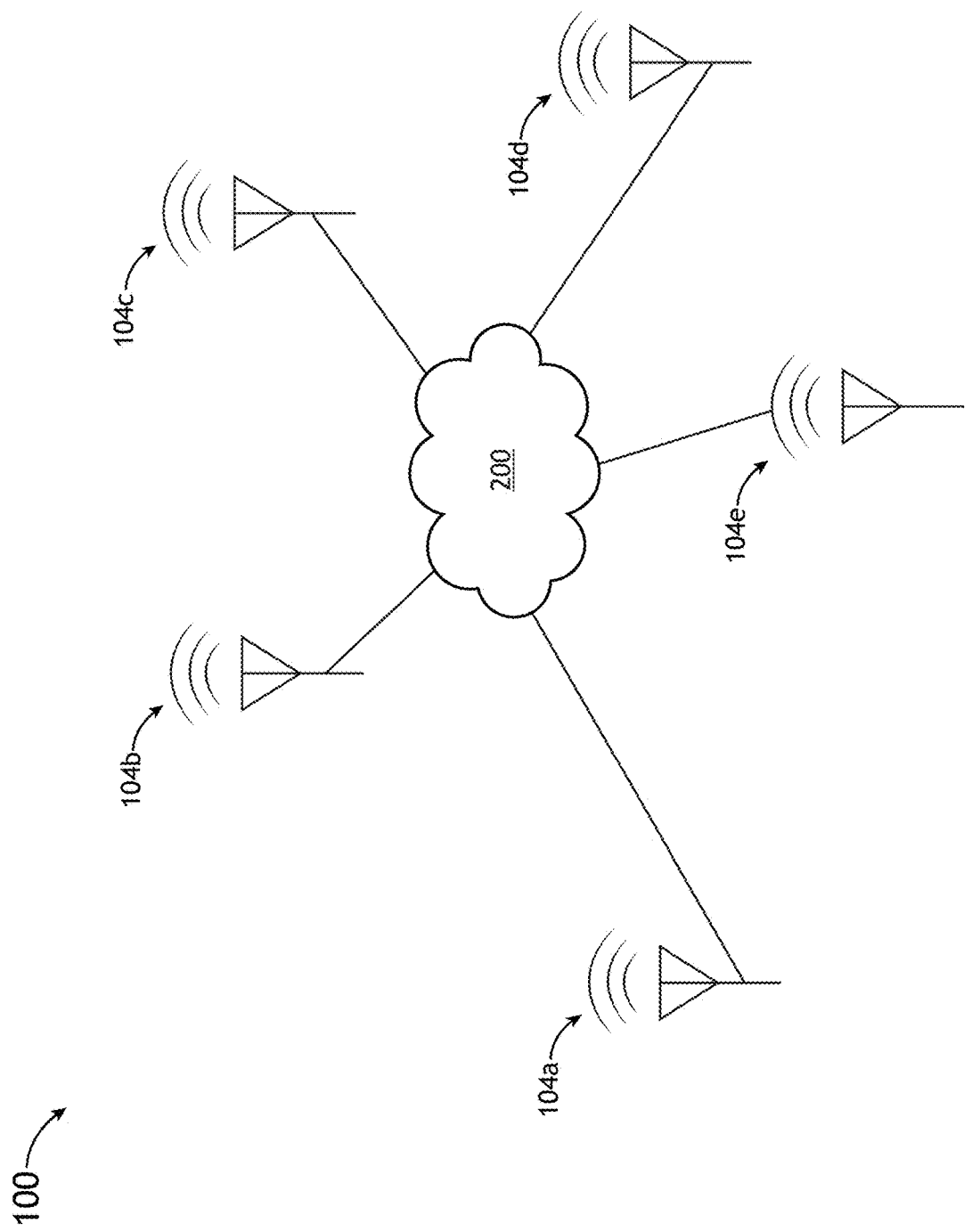
FIG. 2B is a diagram illustrating a communication system configured for diversity signal processing, in accordance with one or more embodiments of this disclosure.

In some embodiments, the one or more antennas 104a-e of the plurality of antennas 104a-e may be organized via the control module 124 to provide diversity reception and/or transmission. For example, if the minimum antenna separation becomes too great for beamforming and/or nulling, the control module 124 may act to organize one or more antennas 104a-e to provide a diversity gain (e.g., as shown in FIG. 2B) For instance, the control module 124 may act to organize one or more antennas 104a-e to provide a diversity gain in a fading channel. These communications are supported via the local bearer 152, as these techniques require real time exchange of signal information or information derived from the signal (e.g., soft decisions) between each platform 102a-e. Fading channels exhibit time-varying variability with respect to receive signal amplitude and phase. When a channel enters a deep fade, the received radio signal level can plummet, resulting in bursts of errors when the signal to noise ratio drops below the threshold where errors occur. With fading channels, when antennas 104a-e are separated by many wavelengths (e.g., 10 or more as a rule of thumb), the fading in the received signals seen at each of the antennas 104a-e is decorrelated. When these radio signals are processed together in a diversity combiner, very significant gains can be achieved. Similarly, when spatially separated antennas 104a-e are used for transmission diversity, if the radio signals are separated in time from one another by a short time delay, a receiver capable of benefitting from multipath and able to resolve the fading paths from each of the transmit antennas 104a-e can obtain a transmit diversity gain. For both transmission and reception diversity, the organization and collaboration of the one or more antennas 104a-e is controlled by the control module 124, or multiple control modules 124 acting in concert with each other.

The concerted action of the multiple control modules 124 may require communication between the multiple control modules 124. For example, communication between control modules 124 may be embodied through control signals that are sent and received via the one or more antennas 104a-c. In another example, communication between control modules 124 may be embodied via non-antenna signaling. For instance, one or more control modules 124 may send an/or receive instructions via a server 200. In another example, the one or more control modules 124 may receive instructions in the form of a preloaded lookup table or user input.

In some embodiments, the one or more antennas 104a-e of the plurality of antennas (i.e., one or more antennas of a network node) may be organized via the control module 124 to provide diversity based-relay transmission and/or reception (e.g., as shown in FIG. 2C). For example, if the ability to exchange the received and/or transmitted radio signal between antennas 104a-c is lost (e.g., from mobile platforms 102a-e moving away from each other, where support by the local bearer 152 is lost), the local nodes can fall back upon an "avalanche" relay operation, where each node that hears a transmission retransmits the same information in a subsequent synchronized data slot (i.e., relay receive diversity and relay transmit diversity).

Avalanche relays are well described in U.S. Pat. No. 4,639,937 entitled "HF Avalanche Relay Communication Technique" filed on Dec. 7, 1983 by McRae and Cain, which is incorporated by reference in its entirety.

In some embodiments, the communication system 100 is configured to support at least two of adaptive antenna processing (e.g., beamforming and/or nulling via the local bearer 152), diversity signal processing (e.g., transmit diversity, receive diversity, and/or diversity combining via the local bearer 152), and relay communication processing (e.g., relay transmit diversity and relay receive diversity via long range communication techniques, such as RF). In other words, the communication system 100 may be synchronously configurable to multiple communication methods (e.g., more than one method at the same time, or more than one method sequentially). For example, the communication system 100 may be configured for beamforming when the one or more platforms 102a-b are close to each other (i.e., the one or more antennas 104a-e are close to each other), then reorganize via the control module 124 to be configured for diversity transmission when the one or more platforms 102a-b move away from each other. In another example, the communication system 100 may be initially configured for diversity transmission, then 100 reorganize via the control module 124 to be configured for relay transmit diversity. In another example, the communication system 100 may be initially configured for relay transmit diversity, then 100 reorganize via the control module 124 to be configured for beamforming (i.e., when the platforms move in close to each other. In some embodiments, the communication system 100 is configured to support adaptive antenna processing, diversity signal processing, and relay communication processing (i.e., all methods are supported).

Figure 2D:
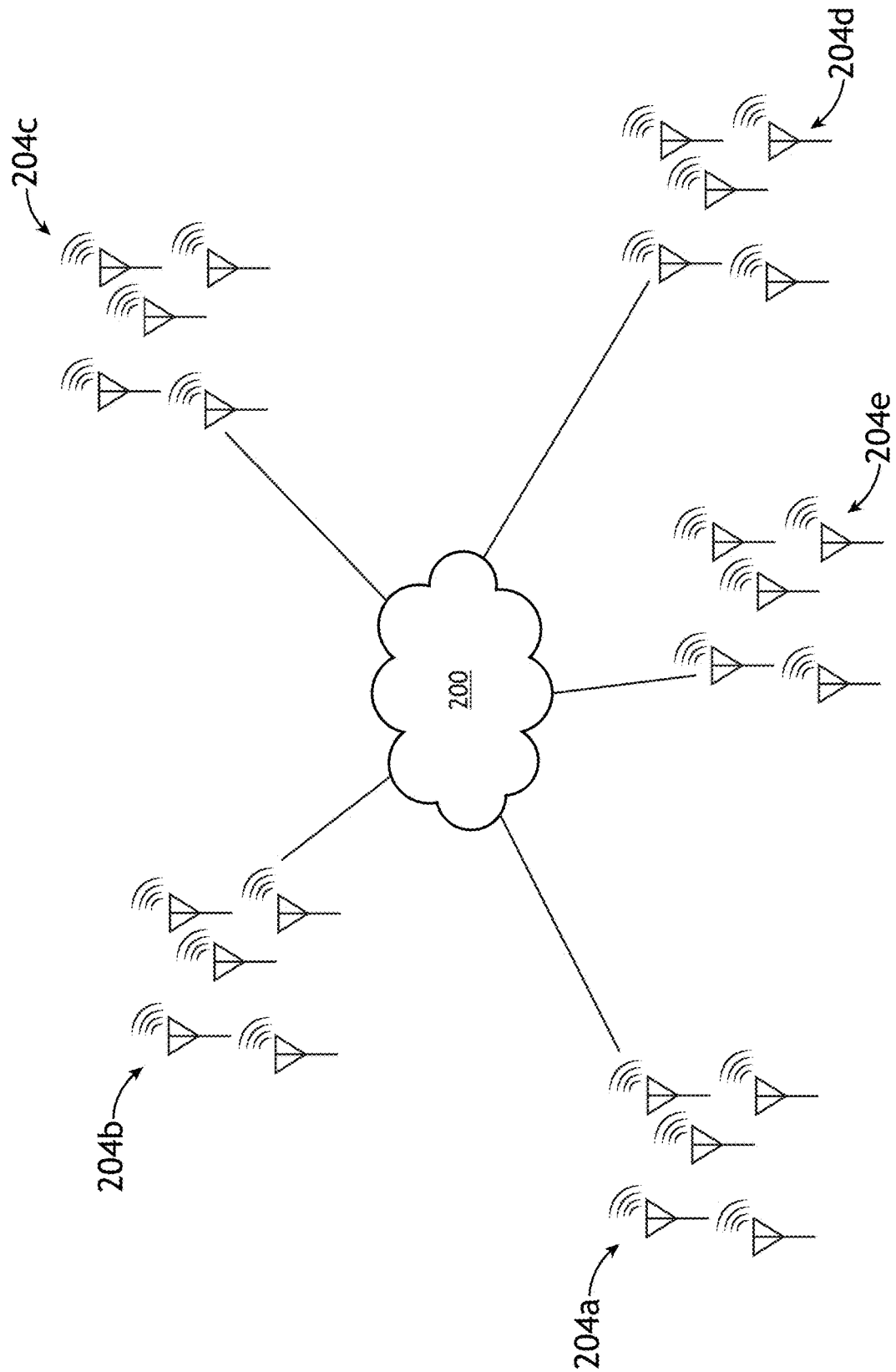
FIG. 2D is a diagram illustrating a communication system configured for adaptive antenna processing and diversity signal processing, in accordance with one or more embodiments of this disclosure.
Figure 2E:
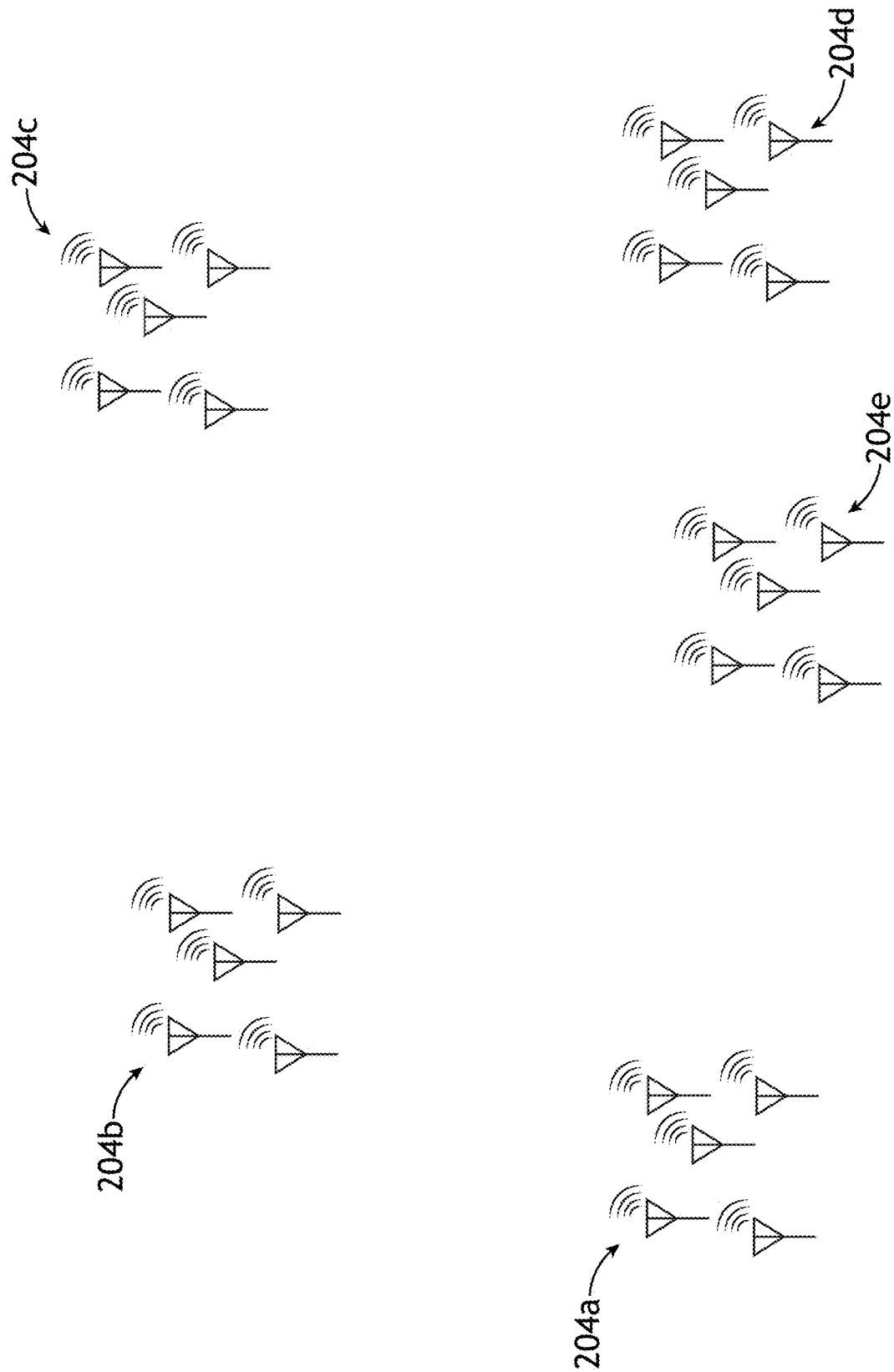
FIG. 2E is a diagram illustrating a communication system configured for diversity signal processing and relay communication processing, in accordance with one or more embodiments of this disclosure.

In some embodiments, the different modes of operation (e.g., adaptive antenna processing, diversity signal, and relay communication processing) may be combined. For example, clusters 204a-e of nodes employing one or more antennas 104a-e that are in close proximity can support adaptive antenna processing via a local bearer to exchange signal (i.e., antennas 104a-e within the same cluster 204a-e performing adaptive antenna processing). If there are multiple clusters 204a-e that are separated by distances too great to support adaptive antenna processing but still within range of the local high data rate bearer, each cluster 204a-e can independently employ adaptive antenna processing with the resulting signal from each cluster 204a-e processed to obtain further gain from a diversity signal processing (e.g., diversity combining). For example, the communication system 100 may gain the benefit of relay receive diversity from multiple platforms 102a-e hearing the original transmission, which then manifests as relay transmit diversity when multiple nodes retransmit the same information via the one or more antennas 104a-e in the subsequent slot. As Avalanche Relay does not require any coordination between nodes or knowledge of topology or geographic location, this mode of operation is supportable without requiring the exchange of information over a local bearer FIG. 2D illustrates a communication system 100 that includes clusters 204a-e of antennas 104a-e, in accordance with one or more embodiments of this disclosure. Adaptive antenna processing is supported between platforms 104a, 104*b* within each cluster 204*a-e* (via the local bearer 152). as well as diversity signal processing (i.e., the antennas 104*a*-2 within each cluster 204*a-e* are spaced closely enough for beamforming or nulling, with each cluster 204*a-e* as a collaborating whole coordinating with other clusters 204*a-e* to provide transmit or receive diversity). Similarly, for a communication system 100 configured with isolated clusters 204*a-e* widely spaced apart, each cluster 204*a-e* may coordinate locally to provide diversity combining or adaptive antenna operation while still operating as a single transmitter and/or receiver with relay communication processing capability (e.g., avalanche relay operation, which relies mainly on pre-planning for coordination) occurring between the isolated clusters 204*a-e* (e.g., as shown in FIG. 2E). Platforms 104*a-e* within the communication system 100 that are not connected by the local bearer 152 may utilize avalanche relay, whether the platform 104-*a-e* is a solitary node or geographically organized within a cluster 204*a-e*.

It should be understood that the isolated clusters 204*a-e* may each have any number of antennas. For example, isolated cluster 204*a* may include one antenna, isolated cluster 204*b* may include three antennas, and isolated cluster 204*c* may include six antennas. Therefore, the above description should not be interpreted as a limitation of the present disclosure, but as an illustration.

Figure 3:
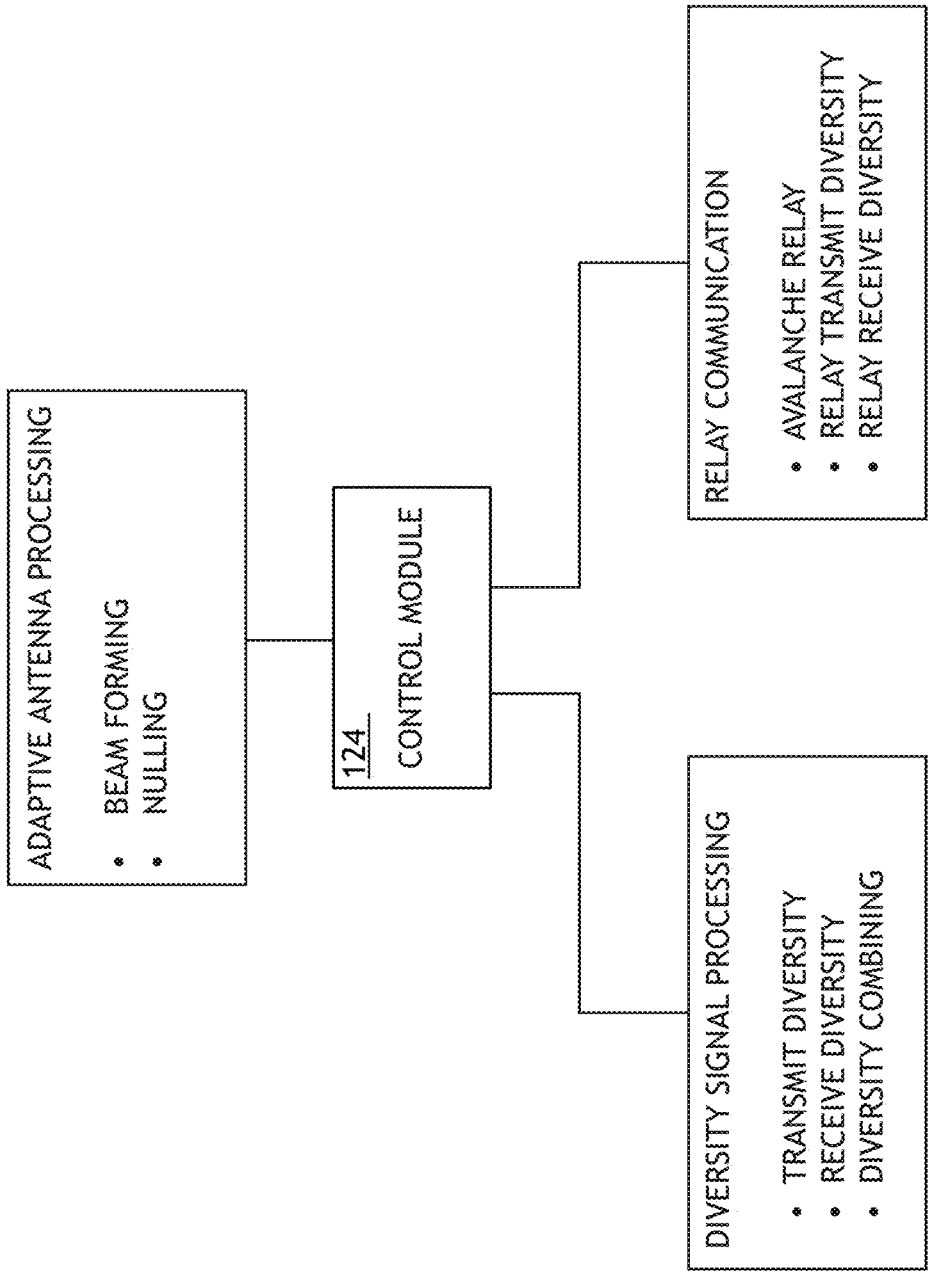
FIG. 3 is a block diagram illustrating the relationship between the control module and the different transmission/reception methods, in accordance with one or more embodiments of this disclosure.

FIG. 3 illustrates the relationship between the control module 124 and the different transmission/reception methods, in accordance with one or more embodiments of this disclosure. The one or more control module 124 are configured to determine, via the one or more processors 134, the available methods of communication to that could utilized within the communication system 100 (e.g., adaptive antenna processing, diversity signal processing, and relay communication processing). The one or more control modules 124 may then facilitate the participation of the one or more platforms 102*a-b* (via the one or more antennas 104*a-e*, the one or more radio units 116*a-b*, the one or more antenna attribute units 146, the one or more phase adjusters, and other control modules 124) in the one or more transmission/reception methods described above.

It should be understood that the communication system 100 may use or be compatible with any type of channel access method including but not limited to frequency division multiple access (FDMA), time division multiple access (TDMA), code division multiple access (CDMA), space division multiple access (SDMA) power division multiple access (PDMA), packet mode methods, duplexing methods, and hybrid channel access scheme application (e.g., Bluetooth). The communication system 100 may also use or be compatible with any type of diversity reception/transmission methods including but not limited to timing combining, transmit/reception diversity, antenna diversity, cooperative diversity, and smart antenna technology. Therefore, the above description should not be interpreted as a limitation of the present disclosure, but as an illustration.

Figure 4:
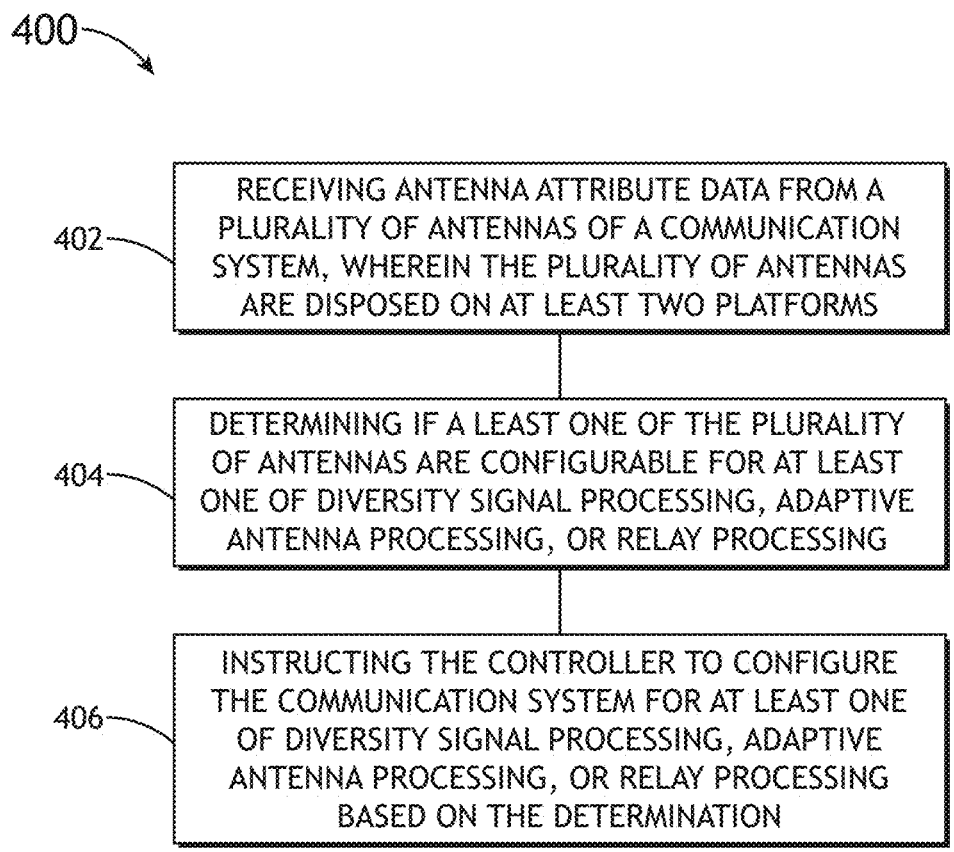
FIG. 4 is a flow diagram illustrating a method 400 for radio communication, in accordance with one or more embodiments of this disclosure.

FIG. 4 is a flow diagram illustrating a method 400 for radio communication, in accordance with one or more embodiments of this disclosure. In some embodiments, the method includes a step 402 of receiving antenna attribute data from a plurality of antennas of a communication system, wherein the plurality of antennas is disposed on at least two platforms. For example, the one or more processors 134 of the control module 124 may receive antenna attribute data that includes positional data of several antennas 104*a-e* via the antenna attribute unit 146.

In some embodiments, the method includes a step 404 of determining if a least one of the plurality of antennas are configurable for at least one of diversity signal processing, adaptive antenna processing, or relay communication processing. In some embodiments, the method includes a step 406 of instructing the controller to configure the communication system for at least one of diversity signal processing, adaptive antenna processing, or relay processing based on the determination (e.g., the determination made by the control module 124 based on the antenna attribute data).

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A communication system comprising:
a plurality of antennas disposed on two or more platforms of a network, wherein the two or more platforms are physically separate and independently mobile to each other;
at least one transmitter disposed on each of the two or more platforms communicatively coupled at least one antenna of the plurality of antennas;
at least one receiver disposed on each of the two or more platforms communicatively coupled to the at least one antenna of the plurality of antennas; and
at least one control module communicatively coupled to the at least one transmitter and the at least one receiver, and disposed on a separate platform than one of the at least one antenna of the plurality of antennas, wherein the at least one control module is configured to control receiving signals received by the at least one receiver, and transmission signals transmitted by the at least one transmitter, wherein the at least one control module comprises:
a controller;
one or more processors communicatively coupled to the controller; and
a memory communicatively coupled to the one or more processors and having instructions stored upon, which when executed by the one or more processors, causing the one or more processors to:
receive antenna attribute data;
determine a compatibility of at least one antenna of the plurality of antennas for relay communication processing and at least one of diversity signal processing or adaptive antenna processing based on the antenna attribute data, wherein the antenna attribute data includes a distance between the at least one antenna and another antenna on a different platform;

instruct the controller to configure the communication system for relay communication processing or at least one of diversity signal processing or adaptive antenna processing based on the compatibility.

2. The system of claim 1, wherein the system is configurable for two or more of the relay communication processing, the diversity signal processing, or the adaptive antenna processing.

3. The system of claim 1, wherein the system is synchronously configured for at least two of the diversity signal processing, the adaptive antenna processing, or the relay communication processing.

4. The system of claim 1, further comprising one or more phase adjusters, wherein the at least one control module adjusts the phase adjusters in accordance with a distance between two or more antennas of the plurality of antennas.

5. The system of claim 1, wherein the diversity signal processing comprises at least one of transmit diversity, receive diversity, or diversity combining.

6. The system of claim 1, wherein the adaptive antenna processing comprises at least one of beamforming or nulling.

7. The system of claim 1, wherein the relay communication processing comprises avalanche relay.

8. The system of claim 1, wherein the system comprises at least one node in an ad hoc network.

9. The system of claim 1, further comprising an antenna attribute unit configured to determine at least one attribute of the antenna attribute data.

10. A method comprising: receiving antenna attribute data from a plurality of antennas of a communication system, wherein the plurality of antennas is disposed on at least two platforms of a network, wherein the two or more platforms are physically separate and independently mobile to each other; determining a compatibility of at least one of the plurality of antennas are configurable for relay communication processing and at least one of diversity signal processing or adaptive antenna processing, wherein the antenna attribute data includes a distance between the at least one antenna and another antenna on a different platform; and instructing a controller to configure the communication system for relay communication processing or at least one of diversity signal processing or adaptive antenna processing based on the compatibility.

11. The system of claim 10, wherein the communication system is configurable for two or more of the diversity signal processing, the relay communication processing or the adaptive antenna processing.

12. The system of claim 10, wherein the communication system is synchronously configured for at least two of the diversity signal processing, the adaptive antenna processing, or the relay communication processing.

13. The method of claim 10, wherein the diversity signal processing comprises at least one of transmit diversity, receive diversity, or diversity combining.

14. The method of claim 10, wherein the adaptive antenna processing comprises at least one of beamforming or nulling.

15. The method of claim 10, wherein the relay communication processing comprises avalanche relay.

* * * * *